US009533368B2

(12) United States Patent
Miyata et al.

(10) Patent No.: US 9,533,368 B2
(45) Date of Patent: Jan. 3, 2017

(54) FLUX-CORED WIRE AND GAS-SHIELDED ARC WELDING METHOD USING THE SAME

(71) Applicant: Kobe Steel, Ltd., Kobe-shi (JP)

(72) Inventors: Minoru Miyata, Fujisawa (JP); Reiichi Suzuki, Fujisawa (JP); Shun Izutani, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 908 days.

(21) Appl. No.: 13/772,599

(22) Filed: Feb. 21, 2013

(65) Prior Publication Data

US 2013/0240488 A1 Sep. 19, 2013

(30) Foreign Application Priority Data

Mar. 13, 2012 (JP) ................................. 2012-056366

(51) Int. Cl.
*B23K 9/173* (2006.01)
*B23K 35/30* (2006.01)
*B23K 35/38* (2006.01)
*B23K 35/02* (2006.01)
*C22C 38/26* (2006.01)
*C22C 38/28* (2006.01)
*C22C 38/38* (2006.01)

(52) U.S. Cl.
CPC ........... *B23K 9/173* (2013.01); *B23K 35/0266* (2013.01); *B23K 35/308* (2013.01); *B23K 35/3086* (2013.01); *B23K 35/383* (2013.01); *C22C 38/26* (2013.01); *C22C 38/28* (2013.01); *C22C 38/38* (2013.01)

(58) Field of Classification Search
CPC .............. B23K 35/0266; B23K 35/308; B23K 35/3086; B23K 35/383; B23K 9/173; C22C 38/26; C22C 38/28; C22C 38/38
See application file for complete search history.

(56) References Cited

U.S. PATENT DOCUMENTS 5,124,529 A 6/1992 Nishikawa et al.
5,685,923 A * 11/1997 Takata .................... C22C 38/28
148/325
2001/0030003 A1* 10/2001 Kim ....................... B23K 35/308
148/325
2005/0161133 A1* 7/2005 Hamada ............... C21D 8/0405
148/602
2009/0261085 A1* 10/2009 Suzuki .................. B23K 9/173
219/137 PS
2011/0055903 A1* 3/2011 Leggette ............. G06F 11/1004
726/4
2011/0114606 A1* 5/2011 Suzuki ............... B23K 35/0266
219/74
2011/0139761 A1* 6/2011 Sugahara ........... B23K 35/0266
219/145.22
2011/0253679 A1 10/2011 Yamazaki et al.
2012/0055903 A1* 3/2012 Izutani ..................... B23K 9/04
219/74
2013/0161303 A1* 6/2013 Kasai .................... B23K 35/22
219/137 WM

FOREIGN PATENT DOCUMENTS

| CN | 1314228 A | 9/2001 |
| EP | 2 377 637 A1 | 10/2011 |
| EP | 2463053 A1 * | 6/2012 |
| JP | 9-85491 | 3/1997 |
| JP | 2001-293596 A | 10/2001 |
| JP | 2007-289965 A | 11/2007 |
| JP | 2007-296535 A | 11/2007 |
| JP | 2007-319910 A | 12/2007 |
| JP | 2009-255125 A | 11/2009 |
| JP | 2011-218437 A | 11/2011 |
| KR | 2001-0100225 A | 11/2001 |

OTHER PUBLICATIONS

Extended Search Report issued Aug. 16, 2013 in European Patent Application No. 13000970.7.
Demostenes Ferreira Filho, et al., "The influence of gas shielding composition and contact tip to work distance in short circuit metal transfer of ferritic stainless steel", Welding International, vol. 24, No. 3, Mar. 1, 2010, XP001570242, pp. 206-213.

* cited by examiner

*Primary Examiner* — Geoffrey S Evans
(74) *Attorney, Agent, or Firm* — Oblon, McClelland, Maier & Neustadt, L.L.P.

(57) ABSTRACT

There is provided a flux-cored wire containing flux within a stainless steel or mild steel outer cover for use in stainless steel welding and gas-shielded arc welding using a shielding gas. The flux-cored wire contains, based on the total mass of the flux-cored wire, predetermined amounts of C, Si, Mn, P, S, Cr, Ti, and O. The remainder are Fe and incidental impurities. The shielding gas is pure Ar gas.

8 Claims, No Drawings

FLUX-CORED WIRE AND GAS-SHIELDED ARC WELDING METHOD USING THE SAME

BACKGROUND OF THE INVENTION

1. Field of the Invention

The present invention relates to a flux-cored wire containing flux within a stainless steel or mild steel outer cover for use in gas-shielded arc welding and stainless steel welding and a gas-shielded arc welding method using the flux-cored wire.

2. Description of the Related Art

Intermediate Cr ferrite steels containing approximately 14% to 19% by mass Cr are widely used as ferritic stainless steels. In particular, SUS430 steel has various uses, such as for internal building materials and automotive decorative materials, and is manufactured in large quantities.

Because of their high corrosion resistance and heat resistance, ferritic stainless steels are also used in automotive exhaust components for high-temperature gas from engines, such as exhaust manifolds, front pipes, and main mufflers.

Ferritic stainless steels can be welded by a gas-shielded arc welding method. The gas-shielded arc welding method employs roughly two types of welding wires: solid wires and flux-cored wires.

Use of solid wires in gas-shielded arc welding can relatively easily reduce the generation of oxides and can realize excellent high-temperature oxidation resistance. However, solid wires generally contain a small number of non-metallic inclusions, which serve as sites for the formation of crystal grains. Welding using solid wires therefore often forms large crystal grains and causes corrosion in grain boundaries. Thus, gas-shielded arc welding using solid wires has low intergranular corrosion resistance.

In view of such situations, a gas-shielded arc welding method using a flux-cored wire has been proposed for welding of ferritic stainless steels.

For example, Japanese Unexamined Patent Application Publications No. 2001-293596 and No. 2007-319910 propose a flux-cored wire having a specified chemical composition of the wire and use of an Ar—$CO_2$ gas containing 20% $CO_2$ gas as a shielding gas.

Japanese Unexamined Patent Application Publications No. 2007-289965, No. 2007-296535, and No. 2009-255125 propose a flux-cored wire (or a welding method) having a specified chemical composition of the wire and use of pure Ar gas as a shielding gas.

In accordance with the techniques described in Japanese Unexamined Patent Application Publications No. 2001-293596, No. 2007-319910, No. 2007-289965, No. 2007-296535, and No. 2009-255125, use of flux-cored wires can reduce the crystal grain size as compared with solid wires and consequently reduce the occurrence of corrosion at grain boundaries, thereby realizing a certain degree of intergranular corrosion resistance.

However, in accordance with the techniques described in Japanese Unexamined Patent Application Publications No. 2001-293596 and No. 2007-319910, 20% $CO_2$ gas in the Ar—$CO_2$ gas used as a shielding gas limits the improvement in corrosion resistance (in particular, high-temperature oxidation resistance), burn through resistance, and welding performance.

In accordance with the techniques using pure Ar gas as a shielding gas described in Japanese Unexamined Patent Application Publications No. 2007-289965, No. 2007-296535, and No. 2009-255125, a wire contains C and O in order to stabilize an arc. The presence of C and O in the wire limits the improvement in corrosion resistance (in particular, high-temperature oxidation resistance).

$CO_2$ in the shielding gas in the technique described in Japanese Unexamined Patent Application Publications No. 2001-293596 and No. 2007-319910 and C and O in the wire in the technique described in Japanese Unexamined Patent Application Publications No. 2007-289965, No. 2007-296535, and No. 2009-255125 make it difficult to decrease the oxygen content of weld metal, thus possibly causing corrosion in the weld metal at high temperature. In other words, there is room for improvement in corrosion resistance (in particular, high-temperature oxidation resistance) in the techniques described in Japanese Unexamined Patent Application Publications No. 2001-293596, No. 2007-319910, No. 2007-289965, No. 2007-296535, and No. 2009-255125.

SUMMARY OF THE INVENTION

Accordingly, it is an object of the present invention to provide a flux-cored wire having improved corrosion resistance (high-temperature oxidation resistance and intergranular corrosion resistance) as well as high burn through resistance and welding performance and a gas-shielded arc welding method using the flux-cored wire.

As a result of extensive studies to solve the problems described above, the present inventors completed the present invention by finding that the problems can be solved by limiting the elements in a flux-cored wire to predetermined amounts to allow stable welding using pure Ar as a shielding gas.

A flux-cored wire according to a first aspect of the present invention is a flux-cored wire containing flux within a stainless steel or mild steel outer cover for use in stainless steel welding and gas-shielded arc welding using a shielding gas. The flux-cored wire contains C: 0.10% by mass or less, Si: 1.50% by mass or less, Mn: 2.00% by mass or less, P: 0.050% by mass or less, S: 0.050% by mass or less, Cr: 15.0% to 25.0% by mass, Ti: 0.16% to 1.00% by mass, and O: 0.300% by mass or less based on the total mass of the flux-cored wire. The remainder are Fe and incidental impurities. The shielding gas is pure Ar gas.

Limiting the C and O contents and the other element contents of the flux-cored wire in the predetermined ranges and using pure Ar gas as a shielding gas can reduce the oxygen content of weld metal and improve corrosion resistance (high-temperature oxidation resistance).

Limiting the element contents of the flux-cored wire according to the first aspect in the predetermined ranges and using pure Ar gas as a shielding gas can also reduce the crystal grain size and improve corrosion resistance (intergranular corrosion resistance).

Although defining such low C and O contents results in low arc stability, it was found that the addition of 0.16% by mass or more Ti can induce a reaction between Ti and O in the molten metal to form $TiO_2$ on the molten pool surface. This stabilizes the behavior of a cathode spot and prevents arc fluctuations characteristic of pure Ar, thereby stabilizing welding, even at C: 0.10% by mass or less and O: 0.300% by mass or less.

Since the flux-cored wire according to the first aspect is used with pure Ar gas free of $CO_2$ as a shielding gas, this can broaden an arc between the flux-cored wire and a base material, resulting in shallow penetration. Thus, the flux-cored wire according to the first aspect has improved burn through resistance.

Furthermore, limiting the element contents of the flux-cored wire according to the first aspect in the predetermined ranges and using pure Ar gas as a shielding gas can also reduce the amount of spatter and the occurrence of weld defects (such as cracks and blowholes) in gas-shielded arc welding. Thus, the flux-cored wire according to the first aspect has improved welding performance.

Preferably, the flux-cored wire according to the first aspect further contains at least one of Al: 1.00% by mass or less and N: 0.05% by mass or less based on the total mass of the flux-cored wire.

When at least one of Al and N is further added to the flux-cored wire according to the first aspect, a nitride can act as a nucleation site and reduce the crystal grain size.

Preferably, the flux-cored wire according to the first aspect further contains Nb: 0.10% to 1.00% by mass based on the total mass of the flux-cored wire.

When the flux-cored wire according to the first aspect further contains Nb, C is fixed as NbC, which can further improve intergranular corrosion resistance.

Preferably, the flux-cored wire according to the first aspect further contains Mo: 3.00% by mass or less based on the total mass of the flux-cored wire.

The flux-cored wire according to the first aspect further containing Mo has further improved corrosion resistance.

Preferably, the flux-cored wire according to the first aspect has a flux filling factor in the range of 5% to 30% by mass based on the total mass of the flux-cored wire.

Limiting the flux filling factor of the flux-cored wire according to the first aspect in the predetermined range can further improve welding performance and bead appearance.

Preferably, the flux-cored wire according to the first aspect has Cr and Ti contents of Cr: 15.0% to 19.0% by mass and Ti: 0.16% to 0.50% by mass. Preferably, the flux-cored wire according to the first aspect has a Nb content of Nb: 0.30% to 1.00% by mass.

Limiting the Cr, Ti, and Nb contents of the flux-cored wire according to the first aspect in the predetermined ranges can improve corrosion resistance, burn through resistance, and welding performance.

A gas-shielded arc welding method according to a second aspect of the present invention includes feeding the flux-cored wire according to the first aspect into a shielding gas of pure Ar and passing a pulsed electric current as a welding current through the flux-cored wire to generate an arc between the flux-cored wire and a base stainless steel to perform welding.

The gas-shielded arc welding method according to the second aspect using the flux-cored wire and pure Ar gas as a shielding gas can improve corrosion resistance, burn through resistance, and welding performance. The gas-shielded arc welding method according to the second aspect using the pulsed electric current as a welding current can reduce the amount of spatter and improve bead appearance.

Limiting the element contents of the flux-cored wire according to the first aspect in the predetermined ranges and using pure Ar gas as a shielding gas can improve corrosion resistance (high-temperature oxidation resistance and intergranular corrosion resistance), burn through resistance, and welding performance.

In accordance with the gas-shielded arc welding method according to the second aspect element, use of the flux-cored wire containing predetermined amounts of elements, use of pure Ar gas as a shielding gas, and use of the pulsed electric current as a welding current can improve corrosion resistance (high-temperature oxidation resistance and intergranular corrosion resistance), burn through resistance, and welding performance.

DESCRIPTION OF THE PREFERRED EMBODIMENTS

A flux-cored wire and a gas-shielded arc welding method using the flux-cored wire according to the present invention will be described in the following embodiments.

[Flux-Cored Wire]

A flux-cored wire according to the present embodiment (hereinafter also referred to simply as a wire) is a flux-cored wire containing flux within a stainless steel or mild steel outer cover for use in stainless steel welding and gas-shielded arc welding using a shielding gas.

More specifically, a flux-cored wire according to the present embodiment includes a tubular outer cover made of stainless steel or mild steel and flux filled within the outer cover. The flux-cored wire may have a seamless outer cover or a seamed outer cover. The wire surface (the outer side of the outer cover) of the flux-cored wire may be coated, for example, by plating.

The flux-cored wire according to the present embodiment contains predetermined amounts of C, Si, Mn, P, S, Cr, Ti, and O. The remainder are Fe and incidental impurities. The reasons for limiting the element contents of the flux-cored wire according to the present embodiment will be described below. These contents are the sum total of the content of the outer cover and the content of the flux and are based on the total mass of the flux-cored wire (the total mass of the outer cover+the total mass of the flux).

C: 0.10% by mass or less

C is an element that can improve strength. However, a C content of more than 0.10% by mass results in the formation of Cr carbide at grain boundaries and/or markedly low corrosion resistance in the vicinity of the grain boundaries. Thus, the C content is 0.10% by mass or less (including 0% by mass).

Si: 1.50% by mass or less

Si is an element that can improve the bead shape. However, use of pure Ar gas as a shielding gas can broaden an arc and/or improve the bead shape. In this case, the flux-cored wire may contain no Si.

Si can accelerate the coarsening of the columnar structure of a weld metal as a ferrite-stabilizing element and segregate at grain boundaries, thereby making the weld metal fragile. Thus, a high Si content results in high susceptibility to weld cracking, such as pear-shaped bead cracking or cracking due to low ductility. More specifically, a Si content of more than 1.50% by mass results in high weld cracking susceptibility and high possibility of weld defects.

Thus, the Si content is 1.50% by mass or less (including 0% by mass).

Mn: 2.00% by mass or less

Mn is an effective deoxidizer and is an element that can easily bind to S. When Mn and S form MnS, this markedly reduces the high-temperature oxidation resistance of the weld metal. More specifically, a Mn content of more than 2.00% by mass results in markedly low high-temperature oxidation resistance.

Thus, the Mn content is 2.00% by mass or less (including 0% by mass).

P: 0.050% by mass or less, S: 0.050% by mass or less

P and S are generally contained as impurities. In the present embodiment, the addition of P or S is of no significance. A P or S content of 0.050% by mass results in low hot cracking resistance and an occurrence of a weld defect.

Thus, each of the P content and the S content is 0.050% by mass or less (including 0% by mass).

Cr: 15.0% to 25.0% by mass

Cr is a main element of ferritic stainless steel. Cr can form a dense oxide mainly composed of $Cr_2O_3$ at high temperature and suppress the diffusion of oxygen, thereby improving high-temperature oxidation resistance. Cr is an essential element for high-temperature strength and corrosion resistance, such as salt corrosion resistance and intergranular corrosion resistance.

A Cr content of less than 15.0% by mass results in low high-temperature oxidation resistance and intergranular corrosion resistance. A Cr content of more than 25.0% by mass results in an increased amount of spatter because of the high melting point of Cr and high costs.

Thus, the Cr content is in the range of 15.0% to 25.0% by mass. Preferably, the Cr content is in the range of 15.0% to 19.0% by mass so as to ensure the effects described above.

Ti: 0.16% to 1.00% by mass

Ti is an element that has a deoxidizing effect and is effective in forming isometric crystals. Ti can reduce pear-shaped bead cracking. Ti can bind to oxygen in molten metal to form an oxide. The addition of Ti allows a cathode spot to be stably formed in a pure argon atmosphere, thereby improving welding. The addition of Ti can also improve intergranular corrosion resistance. These effects are insufficient at a Ti content of less than 0.16% by mass. However, a Ti content of more than 1.00% by mass is unfavorable because of an excessive arc pressure, an increased amount of spatter, and a convex bead shape.

Thus, the Ti content is in the range of 0.16% to 1.00% by mass. Preferably, the Ti content is in the range of 0.16% to 0.50% by mass so as to ensure the effects described above.

O: 0.300% by mass or less

O is an element that can lower high-temperature oxidation resistance. Thus, the O content must be reduced. More specifically, an O content of more than 0.300% by mass results in markedly low high-temperature oxidation resistance.

Thus, the O content is 0.300% by mass or less (including 0% by mass).

Provided that the O content is 0.300% by mass or less, O in the wire may be in the form of any compound, such as $TiO_2$, $ZrO_2$, $MgO$, $SiO_2$, $FeO$, $Fe_2O_3$, $MnO$, $MnO_2$, $Al_2O_3$, $CaO$, or $Li_2O$. More specifically, provided that the O content is 0.300% by mass or less, the flux-cored wire according to the present embodiment may contain at least one of these compounds so as to stabilize the arc or reduce the crystal grain size.

Fe and Incidental Impurities

Fe of the remainder includes Fe in the outer cover and Fe in an iron powder and an alloy powder associated with the flux.

The incidental impurities of the remainder include components other than the components described above (Al, N, Nb, and Mo) and incidental optional components contained in the components described above. These incidental impurities may be contained without losing the advantages of the present invention.

A flux-cored wire according to the present embodiment preferably contains predetermined amounts of Al, N, Nb, and/or Mo.

Al: 1.00% by mass or less, N: 0.05% by mass or less

Al and N are elements that can form AlN (aluminum nitride) and are effective in reducing the crystal grain size. However, an Al content of more than 1.00% by mass results in an increase in the amount of spatter and eventually a blockage of and damage to an automotive exhaust component. A N content of more than 0.05% by mass results in frequent occurrence of blowholes.

Thus, when the flux-cored wire contains Al and/or N, at least one of Al: 1.00% by mass or less (including 0% by mass) and N: 0.05% by mass or less (including 0% by mass) are preferably contained.

Nb: 0.10% to 1.00% by mass

Nb is an element that can bind to carbon and nitrogen to form a carbide or nitride, which acts as a nucleus for the formation of ferrite. Thus, Nb is expected to form a carbide or nitride, thereby reducing the crystal grain size and improving high-temperature strength. These effects require the addition of 0.10% by mass or more Nb. Because of the high melting point of Nb, the addition of excessive Nb causes spatters. Thus, the Nb content is 1.00% by mass or less. Thus, when the flux-cored wire contains Nb, the Nb content is preferably in the range of 0.10% to 1.00% by mass. More preferably, the Nb content is in the range of 0.30% to 1.00% by mass so as to ensure the effects described above.

Mo: 3.00% by mass or less

Although Mo is an element that is effective in improving corrosion resistance, Mo is expensive and has a high melting point. Thus, an excessively high Mo content results in an increase in the amount of spatter. More specifically, a Mo content of more than 3.00% by mass results in a large amount of spatter.

Thus, when the flux-cored wire contains Mo, the Mo content is preferably 3.00% by mass or less.

Flux Filling Factor

Preferably, the flux-cored wire according to the present embodiment has a flux filling factor in the range of 5% to 30% by mass based on the total mass of the flux-cored wire. A flux filling factor of less than 5% by mass or more than 30% by mass results in a poor arc stabilizing effect in a pure Ar gas welding atmosphere and consequently an increase in the amount of spatter and a poor bead appearance.

The flux filling factor is the ratio of the mass of flux in the outer cover to the total mass of the wire (outer cover+flux).

Others

The outer diameter, the inner diameter, and other features of the outer cover of the flux-cored wire according to the present embodiment are not particularly limited. The material of the outer cover is stainless steel or mild steel and is not particularly limited provided that the composition of the flux-cored wire satisfies the ranges described above.

[Shielding Gas]

The shielding gas according to the present embodiment is pure Ar gas.

Since the shielding gas of pure Ar is free of $CO_2$, this can broaden an arc between the flux-cored wire and a base material, resulting in shallow penetration. Thus, use of pure Ar gas as a shielding gas can greatly improve burn through resistance.

[Base Material]

The base material to be welded is stainless steel, for example, ferritic stainless steel for use as internal building materials, automotive decorative materials, or automotive exhaust materials. The composition, shape, and other characteristics of stainless steel are not particularly limited.

[Gas-Shielded Arc Welding Method]

A gas-shielded arc welding method will be described below.

A gas-shielded arc welding method according to the present embodiment includes feeding a flux-cored wire into a shielding gas of pure Ar and passing a welding current through the flux-cored wire to generate an arc between the flux-cored wire and a base stainless steel to perform welding. The welding current is a pulsed electric current.

Use of the pulsed electric current as the welding current can further improve the welding performance of the gas-shielded arc welding using the shielding gas of pure Ar.

The conditions for the pulsed electric current are not particularly limited, for example, the peak electric current: 400 to 460 A, the peak electric current period: 1.0 to 2.0 ms, and the base electric current: 100 A or less.

EXAMPLES

A flux-cored wire and a gas-shielded arc welding method using the flux-cored wire according to the present embodiment will be further described in the following examples that comply with the requirements set forth in the present invention and comparative examples that do not comply with the requirements.

Flux-Cored Wire, Shielding Gas

A flux-cored wire had a composition shown in Table 1. The flux-cored wire had a wire diameter (the outer diameter of its outer cover) of 1.2 mm.

The shielding gas used had a composition shown in Table 1.

Base Material

A stainless steel sheet in conformity with ISO 9444 was used as a base material. Two of such stainless steel sheets (300 mm×55 mm×2.0 mm) were stacked with the edges out of alignment by 25 mm and were (temporarily) bonded together by spot welding. The welding gap was 0 mm.

Welding Conditions

The corners of the stainless steel sheets bonded together by spot welding were welded by lap welding (150 mm).

Test Nos. 1 to 38 were welded in a horizontal position (0 degrees relative to the horizontal plane) while the torch angle was 90 degrees with respect to the base material surface.

The detailed conditions of electric current-voltage, the distance between the base material and a chip, the flow rate (shielding gas), the welding speed, and the wire feed rate for test Nos. 1 to 38 are described below.

The term "pulse" in the electric current column in Table 1 means that the pulsed welding current was used and that welding was performed under conditions as follows: electric current-voltage: 180 A-18 V, the distance between the base material and the chip: 15 mm, the flow rate: 25 liter/min, the welding speed: 100 cm/min, and the wire feed rate: 7.4 m/min.

The term "non-pulse" in the electric current column in Table 1 means that the welding current had constant current and constant voltage characteristics instead of the pulse shape and that welding was performed under conditions as follows: electric current-voltage: 180 A-18 V, the distance between the base material and the chip: 15 mm, the flow rate: 25 liter/min, the welding speed: 100 cm/min, and the wire feed rate: 6.0 m/min.

Measurement Method and Evaluation Criteria for Amount of Spatter

The amount of spatter (g/min) was measured by placing a box made of a copper plate on both sides of a weld (more specifically, a 400 mm×150 mm×150 mm box was placed on both sides of the base material), performing welding, collecting spatters generated for 1 minute from the box, and measuring the total mass of the spatters.

When the amount of spatter was more than 1.00 g/min, the scattering of spatters was noticeable. Thus, the amount of spatter of 1.00 g/min or less was rated good (circle), and the amount of spatter of 0.50 g/min or less was rated excellent (double circle). The amount of spatter of more than 1.00 g/min was rated poor (cross).

Detection and Evaluation Criteria for Weld Defects

In order to detect weld defects, a bead (150 mm) after welding was subjected to X-ray photography to check for cracks and to a radiographic test (RT, see JIS Z 3104) to check for blowholes.

A bead without cracks or blowholes was rated excellent (double circle), a bead with no cracks and two or less blowholes was rated good (circle), and a bead with cracks was rated poor (cross).

Measurement Method and Evaluation Criteria for High-Temperature Oxidation Resistance The high-temperature oxidation resistance was evaluated by performing four-layer welding (welding current: 200 A, welding speed: 30 cm/min), sampling an oxidized test piece having a thickness of 1.2 mm, a width of 20 mm, and a length of 25 mm from the final layer, measuring the weight of the test piece, heating the test piece in the atmosphere at 1000° C. for 100 hours, and measuring the weight of the test piece.

When the weight increase due to oxidation was 0.30 mg/cm$^2$ or less, more than 0.30 mg/cm$^2$ and 0.70 mg/cm$^2$ or less, or more than 0.70 mg/cm$^2$, the high-temperature oxidation resistance was rated excellent (double circle), good (circle), or poor (cross), respectively.

Measurement Method and Evaluation Criteria for Intergranular Corrosion Resistance Intergranular corrosion resistance was evaluated in an oxalic acid etching test according to JIS G 0571. The intergranular corrosion resistance was rated excellent (double circle) when the etched structure was a stepped structure (a stepped structure without grooves at grain boundaries), good (circle) when the etching structure was a mixed structure (with grooves at part of grain boundaries but without a crystal grain surrounded by grooves), or poor (cross) when the etching structure was a groove-like structure (a structure having at least one crystal grain surrounded by grooves).

Inspection Method and Evaluation Criteria for Bead Appearance

The bead appearance was visually inspected for meandering, a convex bead shape, and the formation of a back bead (burn through).

The bead appearance having no meandering, no convex shape, and no back bead was rated excellent (double circle). The bead appearance having a negligible convex shape (an excess metal height of less than 2.3 mm) was rated good (circle). The bead appearance having meandering, a convex shape (an excess metal height of 2.3 mm or more), or a back bead was rated poor (cross).

Table 1 shows the results for welding using flux-cored wires under predetermined welding conditions. The underlined values in the table are outside the scope of the present invention. Ar-x% $CO_2$ in the table means that $CO_2$ gas constitutes x% of the Ar-$CO_2$ gas, and the remainder is Ar gas. FCW denotes a flux-cored wire, and solid represents a solid wire. F1 represents a mild steel hoop, and F2 represents a ferritic stainless steel hoop.

TABLE 1

| Test No. | Hoop | Wire | Flux (%) | Shielding gas | Electric current | Composition based on total mass of wire (% by mass) | | | | | | | | | | | |
|---|---|---|---|---|---|---|---|---|---|---|---|---|---|---|---|---|---|
| | | | | | | C | Si | Mn | P | S | Cr | Ti | Al | N | Nb | Mo | O |
| 1 | F1 | FCW | 21 | Ar | Pulse | 0.01 | 0.49 | 1.85 | 0.006 | 0.008 | 16.5 | 0.22 | 1.1 | 0.03 | 0.64 | 0.02 | 0.130 |
| 2 | F1 | FCW | 22 | Ar | Pulse | 0.01 | 0.51 | 0.15 | 0.006 | 0.008 | 16.5 | 0.35 | 0.3 | 0.06 | 0.75 | 0.01 | 0.230 |
| 3 | F1 | FCW | 28 | Ar | Pulse | 0.03 | 0.15 | 1.56 | 0.021 | 0.034 | 17.5 | 0.46 | 0.8 | 0.01 | 0.01 | 1.2 | 0.190 |
| 4 | F2 | FCW | 15 | Ar | Pulse | 0.09 | 0.01 | 0.05 | 0.041 | 0.009 | 18.7 | 0.48 | 0.1 | 0.01 | 1.03 | 1.95 | 0.010 |
| 5 | F2 | FCW | 18 | Ar | Pulse | 0.01 | 1.24 | 1.74 | 0.021 | 0.032 | 15.2 | 0.5 | 0.5 | 0.02 | 0.34 | 3.05 | 0.240 |
| 6 | F2 | FCW | 27 | Ar | Pulse | 0.03 | 1.43 | 0.34 | 0.015 | 0.009 | 16.5 | 0.56 | 0.7 | 0.01 | 0.67 | 2.86 | 0.190 |
| 7 | F1 | FCW | 27 | Ar | Pulse | 0.08 | 0.32 | 0.45 | 0.013 | 0.021 | 19.5 | 0.4 | 0.4 | 0.01 | 0.7 | 1.95 | 0.040 |
| 8 | F2 | FCW | 13 | Ar | Pulse | 0.01 | 1.23 | 0.54 | 0.011 | 0.012 | 18.4 | 0.4 | 0.4 | 0.02 | 0.1 | 1.03 | 0.120 |
| 9 | F1 | FCW | 20 | Ar | Pulse | 0.01 | 0.45 | 1.21 | 0.009 | 0.011 | 17.5 | 0.5 | 0.2 | 0.01 | 0.01 | 1.45 | 0.160 |
| 10 | F2 | FCW | 9 | Ar | Pulse | 0.06 | 0.73 | 1.03 | 0.005 | 0.031 | 18.5 | 0.2 | 0.3 | 0.01 | 1.06 | 2.31 | 0.180 |
| 11 | F1 | FCW | 19 | Ar | Pulse | 0.01 | 0.02 | 0.14 | 0.009 | 0.011 | 16.5 | 0.25 | 0.01 | 0.01 | 0.21 | 0.021 | 0.020 |
| 12 | F1 | FCW | 17 | Ar | Non-pulse | 0.02 | 0.45 | 0.32 | 0.008 | 0.009 | 17.2 | 0.33 | 0.5 | 0.02 | 0.75 | 2.31 | 0.090 |
| 13 | F1 | FCW | 32 | Ar | Pulse | 0.03 | 1.41 | 1.96 | 0.007 | 0.004 | 18.9 | 0.48 | 0.98 | 0.03 | 0.91 | 2.95 | 0.130 |
| 14 | F2 | FCW | 4 | Ar | Pulse | 0.01 | 0.23 | 0.43 | 0.001 | 0.003 | 18.3 | 0.43 | 0.14 | 0.01 | 0.75 | 0.01 | 0.150 |
| 15 | F1 | FCW | 19 | Ar | Non-pulse | 0.01 | 0.24 | 0.45 | 0.008 | 0.015 | 17.3 | 0.34 | 0.13 | 0.02 | 0.79 | 2.01 | 0.110 |
| 16 | F1 | FCW | 29 | Ar | Pulse | 0.02 | 0.5 | 0.6 | 0.041 | 0.009 | 17.2 | 0.3 | 0.5 | 0.04 | 0.7 | 0.01 | 0.150 |
| 17 | F2 | FCW | 6 | Ar | Pulse | 0.01 | 1.05 | 1.5 | 0.008 | 0.009 | 15.5 | 0.49 | 0.3 | 0.01 | 0.5 | 0.01 | 0.250 |
| 18 | F2 | FCW | 13 | Ar | Pulse | 0.01 | 1.48 | 0.3 | 0.009 | 0.012 | 17 | 0.4 | 0.01 | 0.01 | 0.8 | 1.2 | 0.190 |
| 19 | F1 | FCW | 19 | Ar | Pulse | 0.02 | 0.03 | 0.1 | 0.011 | 0.009 | 16.5 | 0.3 | 0.01 | 0.01 | 0.75 | 0.01 | 0.010 |
| 20 | F2 | FCW | 15 | Ar | Pulse | 0.08 | 1.01 | 1.21 | 0.004 | 0.045 | 18.7 | 0.43 | 0.94 | 0.03 | 0.87 | 2.87 | 0.180 |
| 21 | F1 | FCW | 25 | Ar | Pulse | 0.02 | 0.21 | 1.93 | 0.004 | 0.005 | 18.5 | 0.19 | 0.23 | 0.02 | 0.33 | 2.46 | 0.120 |
| 22 | F1 | FCW | 22 | Ar | Pulse | 0.01 | 0.13 | 0.65 | 0.013 | 0.021 | 16.7 | 0.25 | 0.13 | 0.01 | 0.63 | 1.23 | 0.180 |
| 23 | F1 | FCW | 19 | Ar | Pulse | 0.12 | 0.45 | 1.03 | 0.021 | 0.032 | 16.4 | 0.54 | 0.13 | 0.02 | 0.56 | 0.14 | 0.120 |
| 24 | F1 | FCW | 22 | Ar | Pulse | 0.04 | 1.54 | 0.43 | 0.035 | 0.024 | 17.2 | 0.35 | 0.31 | 0.01 | 0.72 | 2.13 | 0.160 |
| 25 | F1 | FCW | 21 | Ar | Non-pulse | 0.02 | 0.35 | 2.05 | 0.005 | 0.012 | 17.3 | 0.24 | 0.31 | 0.02 | 0.54 | 1.54 | 0.010 |
| 26 | F2 | FCW | 12 | Ar | Pulse | 0.01 | 1.24 | 1.02 | 0.053 | 0.012 | 17.5 | 0.37 | 0.24 | 0.01 | 0.75 | 0.24 | 0.150 |
| 27 | F1 | FCW | 21 | Ar | Pulse | 0.02 | 1.45 | 0.23 | 0.02 | 0.053 | 15.2 | 0.23 | 0.01 | 0.02 | 0.58 | 2.86 | 0.240 |
| 28 | F1 | FCW | 15 | Ar | Non-pulse | 0.02 | 0.21 | 0.32 | 0.021 | 0.046 | 14.8 | 0.98 | 0.51 | 0.02 | 0.75 | 0.021 | 0.010 |
| 29 | F2 | FCW | 18 | Ar | Pulse | 0.01 | 1.43 | 1.02 | 0.028 | 0.032 | 25.3 | 0.21 | 0.89 | 0.02 | 0.89 | 0.04 | 0.120 |
| 30 | F2 | FCW | 16 | Ar | Pulse | 0.02 | 0.89 | 1.28 | 0.012 | 0.032 | 18.5 | 0.12 | 0.34 | 0.01 | 0.33 | 0.04 | 0.180 |
| 31 | F1 | FCW | 27 | Ar | Non-pulse | 0.01 | 1.04 | 0.84 | 0.021 | 0.043 | 16.4 | 1.04 | 0.47 | 0.01 | 0.34 | 1.05 | 0.160 |
| 32 | F1 | FCW | 23 | Ar | Pulse | 0.01 | 0.45 | 0.34 | 0.021 | 0.034 | 17.3 | 0.32 | 0.04 | 0.03 | 0.36 | 0.01 | 0.330 |
| 33 | F1 | FCW | 23 | Ar—2% O₂ | Pulse | 0.01 | 0.02 | 1.23 | 0.012 | 0.021 | 17.4 | 0.37 | 0.24 | 0.01 | 0.45 | 0.02 | 0.230 |
| 34 | F1 | FCW | 24 | Ar—5% O₂ | Pulse | 0.02 | 0.34 | 0.53 | 0.021 | 0.009 | 17.3 | 0.43 | 0.2 | 0.02 | 0.56 | 0.64 | 0.150 |
| 35 | F1 | FCW | 23 | Ar—5% CO₂ | Pulse | 0.01 | 1.03 | 0.89 | 0.025 | 0.021 | 17.3 | 0.37 | 0.45 | 0.02 | 0.74 | 0.01 | 0.170 |
| 36 | F2 | FCW | 18 | Ar—20% CO₂ | Pulse | 0.02 | 1.42 | 0.54 | 0.03 | 0.023 | 18.5 | 0.18 | 0.31 | 0.03 | 0.82 | 0.02 | 0.040 |
| 37 | F1 | FCW | 19 | CO₂ | Pulse | 0.01 | 0.75 | 0.42 | 0.012 | 0.035 | 18.3 | 0.19 | 0.12 | 0.01 | 0.74 | 0.02 | 0.130 |
| 38 | — | Solid | 0 | Ar | Pulse | 0.01 | 0.64 | 0.35 | 0.05 | 0.032 | 17.2 | 0.17 | 0.01 | 0.01 | 0.54 | 0.01 | 0.160 |

| Test No. | Amount of spatter (g/min) | | | Weld defect | High-temperature oxidation resistance (mg/cm²) | | Intergranular corrosion resistance | | Bead appearance |
|---|---|---|---|---|---|---|---|---|---|
| 1 | ○ | 0.53 | ○ | Blow 1 | ◎ | 0.1 | ◎ | Stepped | ◎ |
| 2 | ◎ | 0.34 | ○ | Blow 1 | ◎ | 0.12 | ◎ | Stepped | ◎ |
| 3 | ◎ | 0.32 | ◎ | — | ◎ | 0.14 | ○ | Mixed | ◎ |
| 4 | ○ | 0.71 | ◎ | — | ◎ | 0.12 | ◎ | Stepped | ◎ |
| 5 | ○ | 0.81 | ◎ | — | ◎ | 0.11 | ◎ | Stepped | ◎ |
| 6 | ○ | 0.83 | ◎ | — | ◎ | 0.12 | ◎ | Stepped | ○ negligible convex bead |
| 7 | ○ | 0.53 | ◎ | — | ◎ | 0.14 | ◎ | Stepped | ◎ |
| 8 | ◎ | 0.42 | ◎ | — | ◎ | 0.15 | ○ | Mixed | ◎ |
| 9 | ◎ | 0.39 | ◎ | — | ◎ | 0.17 | ○ | Mixed | ◎ |
| 10 | ○ | 0.71 | ◎ | — | ◎ | 0.11 | ◎ | Stepped | ◎ |
| 11 | ◎ | 0.32 | ◎ | — | ◎ | 0.16 | ○ | Mixed | ◎ |
| 12 | ○ | 0.92 | ◎ | — | ◎ | 0.18 | ◎ | Stepped | ◎ |
| 13 | ○ | 0.78 | ◎ | — | ◎ | 0.19 | ◎ | Stepped | ○ |
| 14 | ○ | 0.82 | ◎ | — | ◎ | 0.15 | ◎ | Stepped | ○ |
| 15 | ○ | 0.91 | ◎ | — | ◎ | 0.13 | ◎ | Stepped | ◎ |
| 16 | ◎ | 0.43 | ◎ | — | ◎ | 0.17 | ◎ | Stepped | ◎ |
| 17 | ◎ | 0.23 | ◎ | — | ◎ | 0.22 | ◎ | Stepped | ◎ |
| 18 | ◎ | 0.35 | ◎ | — | ◎ | 0.21 | ◎ | Stepped | ◎ |
| 19 | ◎ | 0.31 | ◎ | — | ◎ | 0.15 | ◎ | Stepped | ◎ |
| 20 | ◎ | 0.37 | ◎ | — | ◎ | 0.15 | ◎ | Stepped | ◎ |
| 21 | ◎ | 0.41 | ◎ | — | ◎ | 0.19 | ◎ | Stepped | ◎ |
| 22 | ◎ | 0.27 | ◎ | — | ◎ | 0.13 | ◎ | Stepped | ◎ |
| 23 | X | 1.42 | ○ | Blow 2 | X | 0.85 | X | Groove | ◎ |
| 24 | ○ | 0.71 | X | High-temperature cracking | ○ | 0.32 | ◎ | Stepped | ◎ |
| 25 | ○ | 0.83 | ◎ | — | X | 0.94 | ○ | Mixed | ◎ |
| 26 | ◎ | 0.21 | X | High-temperature cracking | ○ | 0.42 | ○ | Mixed | ◎ |
| 27 | ◎ | 0.41 | X | High-temperature cracking | ◎ | 0.16 | ◎ | Stepped | ◎ |

TABLE 1-continued

| | | | | | | | | | |
|---|---|---|---|---|---|---|---|---|---|
| 28 | ○ | 0.83 | ◎ | — | X | 0.88 | X | Groove | ○ |
| 29 | X | 1.13 | ◎ | — | ○ | 0.42 | ◎ | Stepped | ◎ |
| 30 | ○ | 0.73 | ◎ | — | ○ | 0.34 | X | Groove | X bead meandering |
| 31 | X | 1.23 | ◎ | — | ○ | 0.53 | ○ | Mixed | X convex bead |
| 32 | ◎ | 0.21 | ◎ | — | X | 0.91 | ○ | Mixed | ○ |
| 33 | ○ | 0.83 | ◎ | — | X | 0.91 | ○ | Mixed | X burn through |
| 34 | ◎ | 0.23 | ◎ | — | X | 0.94 | ○ | Mixed | X burn through |
| 35 | ◎ | 0.42 | ◎ | — | X | 0.84 | X | Groove | X burn through |
| 36 | ○ | 0.81 | ◎ | — | X | 0.82 | X | Groove | X burn through |
| 37 | X | 1.89 | ◎ | — | X | 0.71 | X | Groove | X burn through |
| 38 | X | 1.63 | ◎ | — | ◎ | 0.13 | ○ | Mixed | X meandering |

Test Nos. 1 to 22 in Table 1 are examples of the present invention. These examples had a reduced amount of spatter and few weld defects and had satisfactory high-temperature oxidation resistance, intergranular corrosion resistance, and bead appearance.

Among test Nos. 1 to 22, test Nos. 16 to 22 satisfy all the requirements of the present invention and had excellent results with respect to all the evaluation items.

Among test Nos. 1 to 22, test Nos. 1 to 11 had a Cr, Ti, Al, N, Nb, or Mo content outside the corresponding preferred range or contained only a small amount of Al, N, Nb, or Mo that was considered to be an incidental impurity. Thus, test Nos. 1 to 11 had just satisfactory results with respect to part of the evaluation items.

Among test Nos. 1 to 22, test Nos. 12 and 15, in which the welding current was a non-pulse electric current, were just satisfactory with respect to the amount of spatter.

Among test Nos. 1 to 22, test Nos. 13 and 14 had a flux filling factor outside the preferred range and were therefore just satisfactory with respect to the amount of spatter and bead appearance.

In contrast, test Nos. 23 to 38 did not satisfy all the requirements of the present invention and were poor with respect to part of the evaluation items. The results will be described in detail below.

Test No. 23, which had a C content outside the scope of the present invention, generated CO gas and was therefore unsatisfactory with respect to the amount of spatter. Test No. 23 also formed a Cr depletion layer and was therefore unsatisfactory with respect to high-temperature oxidation resistance and intergranular corrosion resistance.

Test No. 24, which had a Si content outside the scope of the present invention, was unsatisfactory with respect to weld defect.

Test No. 25, which had a Mn content outside the scope of the present invention, formed MnS and was therefore unsatisfactory with respect to high-temperature oxidation resistance.

Test No. 26, which had a P content outside the scope of the present invention, was unsatisfactory with respect to weld defect.

Test No. 27, which had a S content outside the scope of the present invention, was unsatisfactory with respect to weld defect.

Test No. 28, which had a Cr content outside the scope of the present invention (below the lower limit), was unsatisfactory with respect to high-temperature oxidation resistance and intergranular corrosion resistance.

Test No. 29, which had a Cr content outside the scope of the present invention (above the upper limit), was unsatisfactory with respect to the amount of spatter.

Test No. 30, which had a Ti content outside the scope of the present invention (below the lower limit), had a meandering bead because of an unstable arc and was unsatisfactory with respect to bead appearance. Test No. 30 was also unsatisfactory with respect to intergranular corrosion resistance.

Test No. 31, which had a Ti content outside the scope of the present invention (above the upper limit), was unsatisfactory with respect to the amount of spatter and bead appearance because of an excessive arc pressure.

Test No. 32, which had an O content outside the scope of the present invention, was unsatisfactory with respect to high-temperature oxidation resistance.

Test Nos. 33 to 37, in which the shielding gas was not pure Ar gas (the shielding gas contained an oxidizing gas), were unsatisfactory with respect to bead appearance (burn through) because of a concentrated arc and were unsatisfactory with respect to high-temperature oxidation resistance because of the formation of an oxide. Part of test Nos. 33 to 37 were also unsatisfactory with respect to the amount of spatter and intergranular corrosion resistance.

Test No. 38, which was a solid wire, was unsatisfactory with respect to the amount of spatter and bead appearance because of an unstable arc.

Although a flux-cored wire and a gas-shielded arc welding method using the flux-cored wire according to the present invention have been described with reference to the embodiments and examples, the gist of the present invention is not limited to these embodiments and examples and should be broadly construed on the basis of the appended claims.

What is claimed is:

1. A flux-cored wire, comprising:
based on a total mass of the flux-cored wire:
C: 0.10% by mass or less,
Si: 1.50% by mass or less,
Mn: 2.00% by mass or less,
P: 0.050% by mass or less,
S: 0.050% by mass or less,
Cr: 15.0% to 25.0% by mass,
Ti: 0.16% to 1.00% by mass,
O: more than 0.04% by mass and less than or equal to 0.300% by mass, and
Fe being the principal element,
wherein
the flux-cored wire is suitable for stainless steel welding and gas-shielded arc welding using pure Ar gas as a shielding gas.

2. The flux-cored wire according to claim 1, further comprising: based on the total mass of the flux-cored wire, at least one of
Al: 1.00% by mass or less,
N: 0.05% by mass or less,
Nb: 0.10% to 1.00% by mass, and
Mo: 3.00% by mass or less.

3. The flux-cored wire according to claim 1, which comprises, based on the total mass of the flux-cored wire:
   Cr: 15.0% to 19.0% by mass,
   Ti: 0.16% to 0.50% by mass, and further compries at least one of
   Al: 100% by mass or less,
   N: 0.05% by mass or less,
   Nb: 0.10% to 100% by mass, and
   Mo: 3.00% by mass or less.

4. The flux-cored wire according to any one of claims 1 to 3, wherein a flux filling factor is in a range of from 5% to 30% by mass based on the total mass of the flux-cored wire.

5. The flux-cored wire according to claim 2 or 3, which comprises Nb in a content of from 0.30% to 1.00% by mass.

6. The flux-cored wire according to claim 1, wherein flux is contained in a stainless steel or mild steel outer cover.

7. The flux-cored wire according to claim 1, further comprising N in a content of from 0.02 to 0.05% by mass.

8. A gas-shielded arc welding method, the method comprising:
   feeding the flux-cored wire according to claim 1 into the shielding gas of pure Ar; and
   passing a pulsed electric current as a welding current through the flux-cored wire to generate an arc between the flux-cored wire and a base stainless steel to perform welding.

* * * * *